(12) United States Patent
Takehisa

(10) Patent No.: US 9,350,137 B1
(45) Date of Patent: May 24, 2016

(54) LASER PROCESSING METHOD AND LASER PROCESSING SYSTEM

(71) Applicant: Kiwamu Takehisa, Kawasaki (JP)

(72) Inventor: Kiwamu Takehisa, Kawasaki (JP)

(*) Notice: Subject to any disclaimer, the term of this patent is extended or adjusted under 35 U.S.C. 154(b) by 0 days.

(21) Appl. No.: 14/699,763

(22) Filed: Apr. 29, 2015

(30) Foreign Application Priority Data

Jan. 23, 2015 (JP) .................................. 2015-011055

(51) Int. Cl.
| | |
|---|---|
| *H01S 3/10* | (2006.01) |
| *H01S 3/11* | (2006.01) |
| *H01S 3/16* | (2006.01) |
| *H01S 3/223* | (2006.01) |
| *H01S 3/23* | (2006.01) |
| *H01S 3/22* | (2006.01) |
| *H01S 3/092* | (2006.01) |
| *H01S 3/034* | (2006.01) |
| *H01S 3/02* | (2006.01) |

(52) U.S. Cl.
CPC . *H01S 3/11* (2013.01); *H01S 3/025* (2013.01); *H01S 3/034* (2013.01); *H01S 3/092* (2013.01); *H01S 3/1608* (2013.01); *H01S 3/1643* (2013.01); *H01S 3/223* (2013.01); *H01S 3/2215* (2013.01); *H01S 3/2232* (2013.01); *H01S 3/23* (2013.01)

(58) Field of Classification Search
CPC ........... H01S 3/11; H01S 3/23; H01S 3/2232; H01S 3/223; H01S 3/034; H01S 3/025; H01S 3/2215; H01S 3/092; H01S 3/1643; H01S 3/1608
See application file for complete search history.

(56) References Cited

U.S. PATENT DOCUMENTS

| | | | | |
|---|---|---|---|---|
| 4,839,497 | A * | 6/1989 | Sankar et al. | ............ 219/121.71 |
| 5,856,648 | A * | 1/1999 | Frauchiger et al. | ...... 219/121.61 |
| 6,683,894 | B1 * | 1/2004 | Lee et al. | ........................ 372/20 |
| 2006/0274794 | A1 * | 12/2006 | Watanabe et al. | .......... 372/29.02 |

OTHER PUBLICATIONS

Stephen C. Hurlock, "COIL technology development at Boeing," Proceedings of SPIE vol. 4631, 101-115 (2002).
Masamori Endo, et al., "History of COIL development in Japan: 1982-2002," Proceedings of SPIE vol. 4631, 116-127 (2002).
Edward A Duff, et al., "Chemical Oxygen Iodine Laser (COIL) Technology and Development," Proceedings of SPIE vol. 5414, 52-68 (2004).
Jarmila Kodymova, "COIL—Chemical Oxygen-Iodine Laser: Advances in development and applications," Proceedings of SPIE vol. 5958, 595818 (2005) (11 pages).
Kevin B. Hewett, "Singlet oxygen generators—the heart of chemical oxygen iodine lasers: past, present and future," Proceedings of SPIE vol. 7131, 71310I (2009) (8 pages).
Vladimir B. Krapchev, et al., Report SRL 02-F-1989, "Laser Pulse Formatting to Reduce Thermal Blooming by Aerosol Vaporization," Final Technical Report, Jan. 17, 1989 (33 page).
M. Endo, et al., "Chemically pumped atomic iodine pulse laser," Appl. Phys. Lett. vol. 59 (8), 891-892 (Aug. 19, 1991).
Kenji Suzuki, et al., High pressure pulsed COIL assisted with an instantaneous production of atomic iodine, Proceedings of SPIE vol. 4184, 124-127 (2001).
Masamori Endo, et al., "High pressure pulsed COIL assisted with an instantaneous production of atomic iodine II," Proceeding of SPIE vol. 5120 XIV, 397-404 (2003).
K. Takehisa, "New concepts of realizing a chemical oxygen laser," Proc. SPIE vol. 9251, 92510X (2014) (15 pages).
Janez Diaci, et al., "Review Comparison of Er:YAG and Er,Cr:YSGG lasers used in dentistry," Journal of the Laser and Health Academy, vol. 2012, No. 1 (13 pages).
U.S. Appl. No. 14/956,034, Kiwamu Takehisa, filed Dec. 1, 2015.

* cited by examiner

*Primary Examiner* — Yuanda Zhang
(74) *Attorney, Agent, or Firm* — Rothwell, Figg, Ernst & Manbeck, P.C.

(57) ABSTRACT

The disclosed invention relates to a method of realizing a laser processing system. The system relating to one aspect of the invention is provided with a processing laser, a vaporization laser, and an oscillator controller. The processing laser is a flashlamp-pumped 1.06 μm solid-state laser, a pulsed iodine laser or an oxygen molecule laser. The vaporization laser is a pulsed laser whose wavelength is longer than 1.4 μm.

5 Claims, 8 Drawing Sheets

LASER PROCESSING METHOD AND LASER PROCESSING SYSTEM

INCORPORATION BY REFERENCE

This application is based upon and claims the benefit of priority from Japanese patent application No. 2015-011055, filed on Jan. 23, 2015, the disclosure of which is incorporated herein in its entirety by reference.

BACKGROUND OF THE INVENTION

1. Field of the Invention

The present invention relates to a laser processing method and a laser processing system.

2. Description of Related Art

It is well known that a laser beam can propagate a long distance without spreading compared with natural light. Therefore, a laser can make a hole by focusing it, in a metal sheet or the like which is placed more than 10 km away. But to make this hole, a high-power laser which has a good air transmissivity, without the laser being absorbed by nitrogen, oxygen and water vapor, is necessary. Such a laser is a solid state laser (i.e. an Nd:YAG laser, a fiber laser or the like) operating at an IR region or an iodine laser.

Regarding the above two types of lasers, the iodine laser, which is sometimes called COIL (Chemical Oxygen Iodine Laser), is well known to be able to operate at a high power CW (continuous wave) mode with a wavelength of 1.315 μm. In order to operate the COIL, singlet oxygen molecule ($O_2(^1\Delta_g)$) is generated from the chemical reaction of chlorine gas with a BHP solution which is a mixed solution of hydrogen peroxide solution ($H_2O_2$) and potassium hydroxide (KOH) or sodium hydroxide (NaOH). By transferring the energy of $O_2(^1\Delta_g)$ to a basic iodine atom (I) (i.e. by producing $I(^2P_{3/2})$ in an exited state from $I(^2P_{1/2})$ in a ground state), the laser can be operated. "Stephen C. Hurlick, et al., "COIL technology development at Boeing," Proceedings of SPIE Vol. 4631, 101-115 (2002)", "Masamori Endo, "History of COIL development in Japan: 1982-2002," Proceedings of SPIE Vol. 4631, 116-127 (2002)", "Edward A. Duff and Keith A. Truesdell, "Chemical oxygen iodine laser (COIL) technology and development," Proceedings of SPIE Vol. 5414, 52-68 (2004)" and "Jarmila Kodymova, "COIL—Chemical Oxygen Iodine Laser: advances in development and applications," Proceedings of SPIE Vol. 5958, 595818 (2005)" explain about the iodine laser.

Conventionally, it is difficult to have the laser propagate to a target placed more than 10 km away even with a laser having good air propagation characteristics if there is a cloud or a fog in the air. In other words, as a cloud or a fog is a cluster of water molecules which accumulate together and become enormous, a laser beam is scattered by the cluster. When there is a fine particle which becomes a core, the molecules of water are clustered. The core of the cluster is sometimes referred to as aerosol. Alternatively, the cluster of water molecules may be referred to as aerosol Therefore, research was performed to improve the air transmissivity by using a laser which can vaporize a cloud or a fog. According to "REPORT SRL 02-F-1989, "LASER PULSE FORMATTING TO REDUCE THERMAL BLOOMING BY AEROSOL VAPORIZATION," FINAL TECHNICAL REPORT, 17 Jan. 1989", a KrF excimer laser can vaporize a cloud or a fog since its beam has a good absorption in regard to aerosol. A laser which can vaporize aerosol is referred to as LAV (Laser for Aerosol Vaporization).

SUMMARY OF THE INVENTION

However, in a case where the cloud or fog appears in the air, even if the laser which has good absorption in water is used (the laser is referred to as a vaporization laser) in order to vaporize a fog or a cloud in the air, the air always fluctuates. Especially on a windy day, a cloud or a fog flows at a speed of several tens of meters per second. The vaporization laser needs to be irradiated during the laser process because the air moves all the time. Therefore, a very high power CW (continuous wave) laser is required for the vaporization, which is a problem.

It is considered that a light cloud contains 0.05 g of water in a cubic meter, and a dark cloud contains 5 g of water. Therefore, if a cloud contains 1 g of water in a cubic meter, a total of 20 g of water is contained in a 100 m beam path with an average diameter of 50 cm during passing of the beam path through the cloud with a thickness of 100 m. The reason for assuming that the beam path has such a large diameter is that a laser beam having a diameter of around 1 m is necessary for the initial beam to focus the laser beam on a target several kilometers away. Considering the fact that approximately 2560J of heat is necessary to evaporate 1 g of 25 degrees C. water, 51 kJ of laser energy is needed to evaporate the 20 g of water. This can be derived by adding the heating-up energy of 20 g of water from 25 to 100 degrees C. with the water vaporization energy of 2250 J/g. But this laser energy is required only for an instant. If a cloud flows 10 meters per second, it takes 0.05 s for water to travel 50 cm across the beam diameter. This means that if the water is continuously vaporized for 1 s, laser energy 20 times larger than that of the above laser energy is necessary. Consequently, approximately 1 MW average power is required for the vaporization laser if a CW laser or a high repetition laser is used. Since it is quite difficult to develop such a high power laser, it is unrealistic to use the high power laser as the vaporization laser. As described above, it was practically impossible to achieve the laser processing when a cloud or a fog appears.

In order to solve the above mentioned problem, the present invention employs a processing laser and a vaporization laser. The processing laser is a flashlamp-pumped 1 μm solid-state laser (such as an Nd:YAG laser or an Nd:glass laser), a pulsed iodine laser, or an oxygen molecule laser. The vaporization laser is a pulsed laser with a wavelength of 1.4 μm or longer. The vaporization laser may be a thulium YAG laser (a Tm:YAG laser), a thulium YLF laser (a Tm:YLF laser), or a holmium YLF laser (a Ho:YLF laser) which have a wavelength of approximately 2.0 μm. The vaporization laser may be an erbium YAG laser (an Er:YAG laser) with a wavelength of 2.94 μm. The vaporization laser may be a pulsed carbon dioxide gas laser ($CO_2$ laser) with a wavelength of 9.4 to 10.6 μm or the like.

Concerning oscillation timing of the processing laser and the vaporization laser, the processing laser oscillates within 1 ms after the oscillation of the vaporization laser. This enables to propagate the beam of the processing laser in a high transmission path formed by the propagation of the vaporization laser before the path is made to fly away by wind.

Assuming that a wind flows toward the beam crossing direction at 10 m/s, the high transmission path moves only 10 mm if the processing laser oscillates at 1 ms after the vaporization laser oscillates. Therefore, the beam radius of the vaporization laser has to be adjusted to be only more than 10 mm larger than that of the processing laser under such a windy condition.

Since the above mentioned flashlamp-pumped Nd:YAG laser, a pulsed iodine laser or an oxygen molecule laser can produce a giant-pulse laser with a high power, This enables a hole to be made in a metal sheet or the like by a single shot. Therefore, using a pulsed vaporization laser, a high transmission path is formed by only a single shot. This enables a required energy for the pulsed vaporization laser to be reduced to a small value. "M. Endo, K. Shiroki, and T. Uchiyama, "Chemically pumped atomic iodine pulse laser," Appl. Phys. Lett. Vol. 59, 891-892 (1991)", "Kenji Suzuki, Kozo Minoshima, Daichi Sugimoto, Kazuyoku Tei, Masamori Endo, Taro Uchiyama, Kenzo Nanri, Shuzaburo Takeda, and Tomoo Fujioka, "High pressure pulsed COIL assisted with an instantaneous production of atomic iodine," Proc. SPIE 4184, 124-127 (2001)" and "Masamori Endo, Kozo Minoshima, Koichi Murata, Oleg Vyskubenko, Kenzo Nanri, Shuzaburo Takeda, and Tomoo Fujioka, "High pressure pulsed COIL assisted with an instantaneous production of atomic iodine II," Proc. SPIE 5120, 397-404 (2003)" explain about the pulsed iodine laser. "K. Takehisa "New concepts for realizing an oxygen molecule laser," Proc. SPIE 9251 (2014)" explains about the oxygen molecule laser.

In the case where the pulsed iodine laser or the oxygen molecule laser is used as the processing laser, in order to automatically oscillate the evaporation laser immediately before the oscillation of the processing laser, a flashlamp-pumped solid-state laser can be used as the vaporization laser. The flashlamp would be triggered using a signal which controls an open/close valve of the chlorine gas tank used for a single oxygen generator of the pulsed iodine laser or the oxygen molecule laser. This enables the pulsed iodine laser or the oxygen molecule laser to be oscillated less than 1 ms after the vaporization laser oscillates. Therefore, the processing laser can propagate through the high transmission path even in a strong wind.

The present invention provides a laser processing method and a laser processing system which can process a target placed a long distance away even in cloudy or foggy air.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
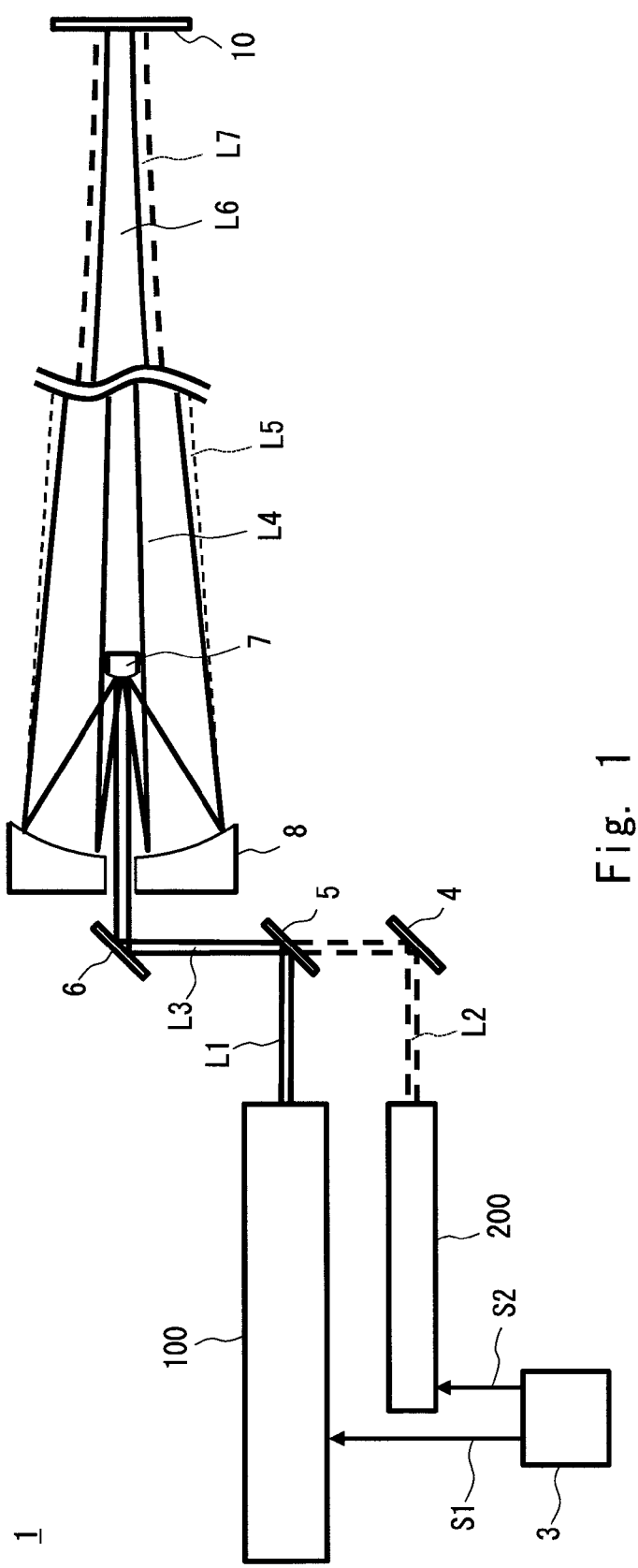
FIG. 1 is a cross sectional drawing of a laser processing system 1 according to an embodiment of the invention.

Exemplary embodiments of the present invention are explained with reference to the attached drawings. The exemplary embodiments explained below are only examples of the present invention, and the present invention is not limited to these exemplary embodiments. Note that components denoted by the same reference numerals in the specification and drawings indicate the same components.

First Embodiment

Figure 5:
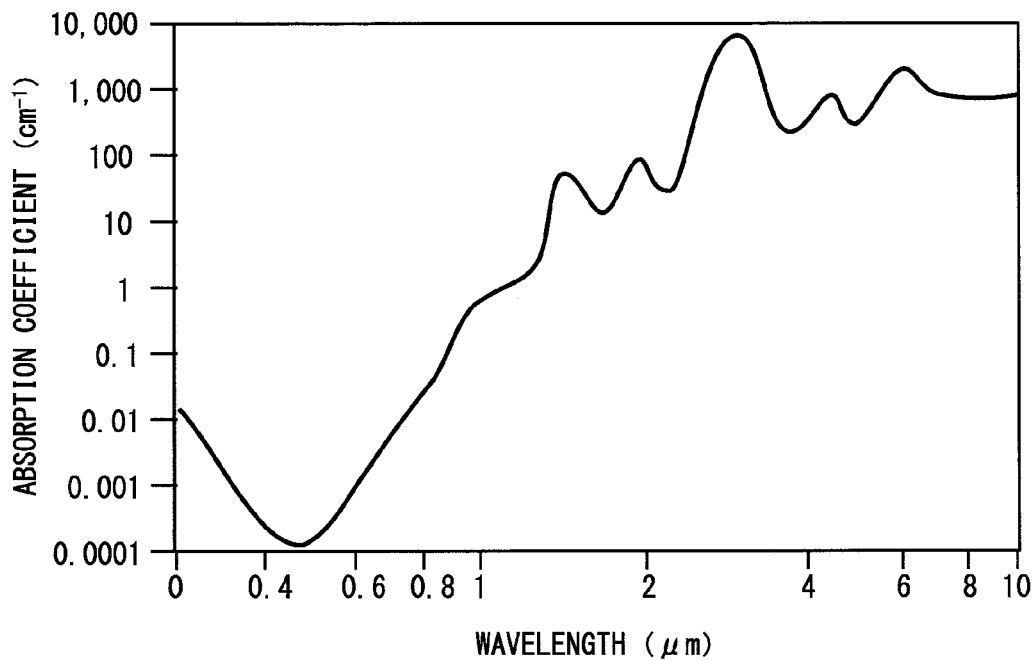
FIG. 5 is a graph showing wavelength dependency of a water absorption coefficient.

Hereinafter, the first embodiment according to the present invention is described based on FIG. 1. FIG. 1 is a cross sectional drawing of a laser processing system 1 for a long distance process according to an embodiment of the invention. In the laser processing system 1, a pulsed iodine laser is used as the processing laser 100, and a flashlamp-pumped Er:YAG laser oscillator is used as the vaporization laser 200. The Er:YAG laser is a solid-state laser oscillating at 2.94 µm wavelength, which has a high absorption rate in water as shown in FIG. 5. "Janez Diaci and Boris Gaspirc, "Comparison of Er:YAG and Er,Cr:YSGG lasers used in dentistry," Journal of the Laser and Health Academy, Vol. 2012, No. 1" explains about the Er:YAG laser.

A pulsed laser L2 is extracted from the vaporization laser 200 of the laser processing system 1 and is reflected at a mirror 4. The laser L2 reflected at the mirror 4 enters on a dichroic mirror 5 where the laser L2 is transmitted, while the pulsed iodine laser, as the processing laser 100, oscillates immediately after the vaporization laser 200 oscillates. Then a pulsed laser L1 with the wavelength of 1.315 um is extracted, and enters on the dichroic mirror 5 where the laser L1 is reflected. The laser L3, propagating from the dichroic mirror 5, is spatial superimposition of the laser L1 and the laser L2. But the laser L2 propagates temporally earlier than the laser L1.

The laser L3 is reflected at a deformable mirror 6, and propagates through a center hole of a large focusing mirror 8 which has a diameter of approximately 1 meter. Then the laser L3 which passes thought the center hole is reflected at the convex mirror 7, and propagates toward the reflecting surface of the focusing mirror 8 (which is illustrated as a concave surface at a right side in FIG. 1). The laser L3 enters the whole surface of the focusing mirror 8. The reflected laser L3 propagates and is focused on the target 10 which is an Aluminum plate. Since the propagation length is long, the beam profile is illustrated as separated lines. The deformable mirror 6 corrects the wavefront of the laser L3 in order to compensate for the effect of the turbulence during the propagation.

In FIG. 1, an envelope line of the 1.315 µm laser L4 and L6 is indicated by solid lines, while an envelope line of the 2.94 µm laser L5 and L7 is indicated by dotted lines. Both laser beams are in a single transverse mode. Since a longer wavelength laser has a larger diffraction angle, the profile of the 2.94 µm laser beam is illustrated as shown to be as wide as the laser L5 and the laser L7.

Concerning the focused sizes of the lasers at the target 10, it is approximately 1.7 mm for the 1.315 µm-wavelength laser L6 which is extracted from the processing laser 100, while it is approximately 4 mm for the 2.94 µm-wavelength laser L7 which is extracted from the vaporization laser 200. Therefore, the beam path of the processing laser 100 is contained in the beam path of the vaporization laser 200. This is the reason why the processing laser beam is not scattered during the propagation, and the processing laser beam can be delivered to the target 10. This is one of the advantageous effects of the present invention, which is realized by using a longer wavelength for the vaporization laser than that of the processing laser.

On the contrary, if an excimer laser is used for the vaporization laser 200, the beam path of the excimer laser is narrower than that of the processing laser near the target 10 since the excimer laser has a shorter wavelength than that of the processing laser. Consequently a part of the beam path of the processing laser is outside of the beam path of the vaporization laser (this is opposite to the illustration in FIG. 1). This is explained later with reference to FIG. 9 and FIG. 10.

The pulsed iodine laser, as the processing laser 100, is controlled to oscillate approximately 1 ms after the oscillation of the Er:YAG laser, as the vaporization laser 200, by a controller 3. The controller 3 outputs a signal S1 to the processing laser 100, and outputs a signal S2 to the vaporization laser 200. The signal S1 controls the oscillation timing of the processing laser 100, while the signal S2 controls the oscillation timing of the vaporization laser 200. This causes the oscillation of the processing laser 100 to be immediately after the oscillation of the vaporization 200.

Therefore, if a cloud or a fog is made to fly by wind blowing at 10 m/s, the cloud or the fog moves around only 10 mm in 1 ms. So a part of the beam path of the processing laser 100, which gets outside of the beam path of the vaporization laser 200, is negligibly small.

Figure 2:
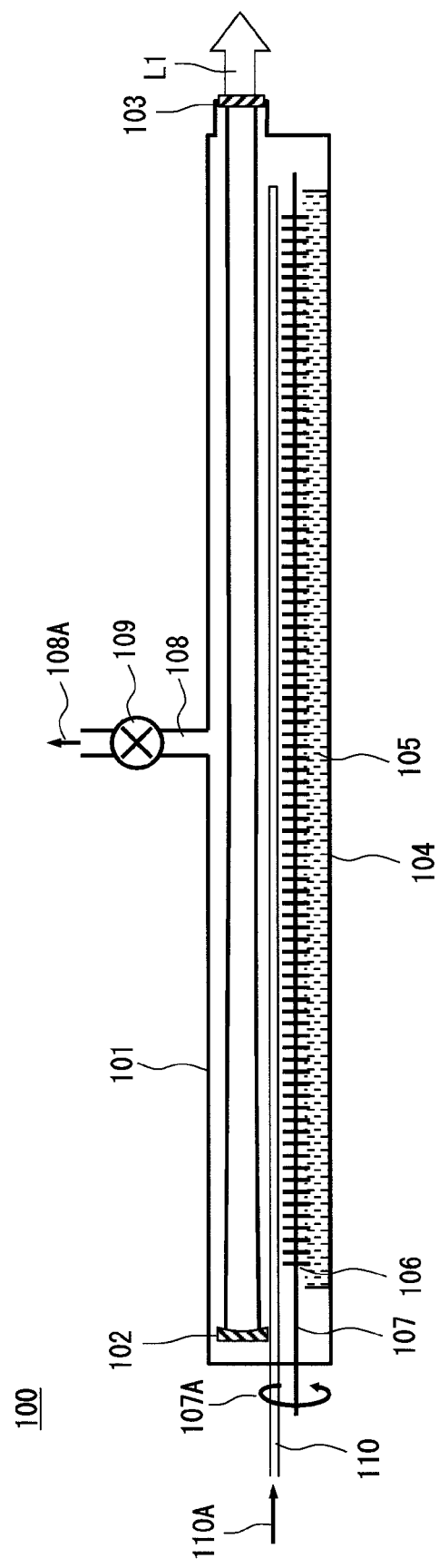
FIG. 2 is a cross-sectional side-view drawing of a processing laser apparatus as a pulsed iodine laser oscillator.
Figure 3:
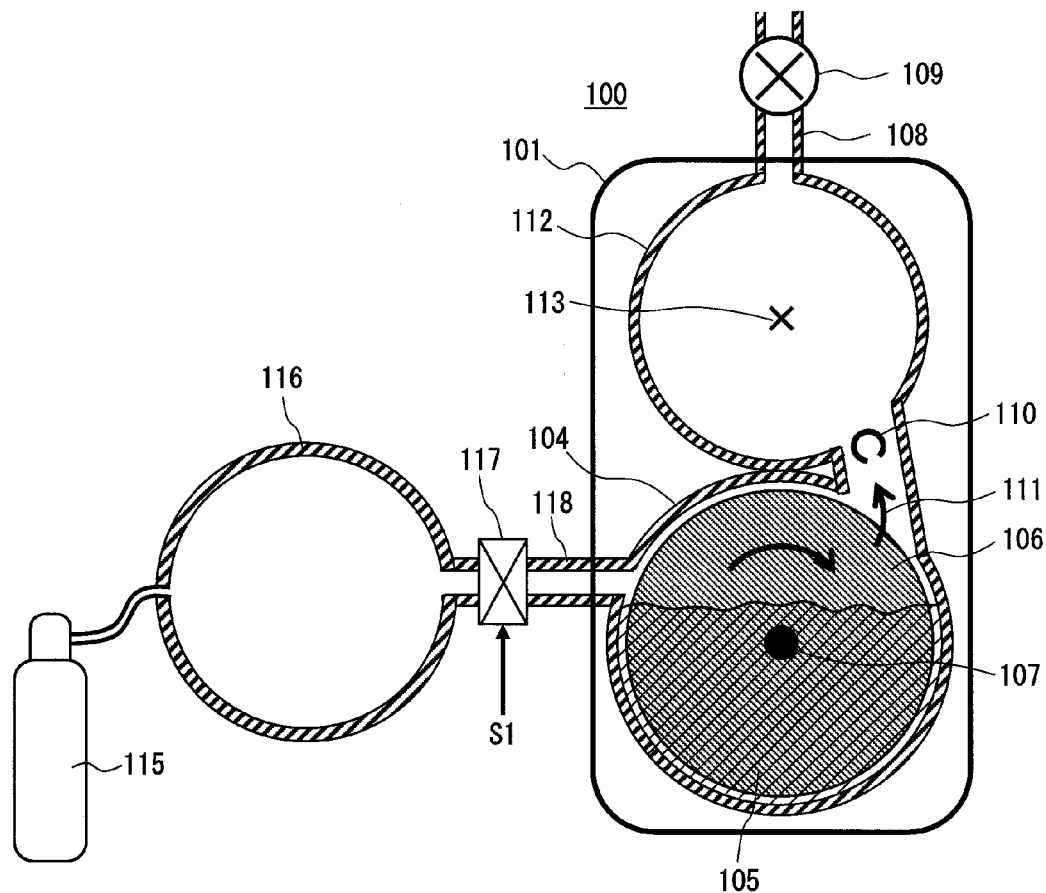
FIG. 3 is a cross sectional drawing, perpendicular to the optical axis, of the pulsed iodine laser oscillator.

Here the details of the pulsed iodine laser, as the processing laser 100, are explained using FIG. 2 and FIG. 3. FIG. 2 is a cross-sectional side-view drawing of the processing laser 100. FIG. 3 is a cross-sectional drawing of the processing laser 100 perpendicular to the optical axis.

As shown in FIG. 2, the processing laser 100 has a laser cavity which is placed in a vacuum-tight housing 101. The laser cavity has a total reflector 102 and an output mirror 103. A singlet oxygen generator 104 is provided under the laser cavity. The singlet oxygen generator 104 stores BHP solution 105. Many discs 106 are placed side by side above the BHP solution 105. The common axis 107 of the discs 106 can rotate in the direction as shown by the arrow 107A. Namely, the singlet oxygen generator 104 is a rotating disc type. Kevin B. Hewett, "Singlet oxygen generators—the heart of chemical oxygen iodine lasers: past, present and future," Proceedings of SPIE Vol. 7131 (2009) explains about the rotating disc type singlet oxygen generator.

In order to oscillate the processing laser 100, the inside of the housing 101 is vacuumed beforehand. At first the valve 109 is opened to vacuum the housing 101 with a vacuum pump (not shown in FIG. 2) in the direction shown by the arrow 108A. Then a large amount of chlorine gas is instantaneously supplied into the housing 101 and contacts the BHP solution 105. This generates singlet oxygen molecules. The details of this are explained later using FIG. 3.

After the singlet oxygen molecules are generated, iodine molecules are supplied through the iodine injection tube 110 as shown by the arrow 110A. Since the iodine molecule is solid at room temperature, the iodine molecules which are vaporized by heating are supplied together with argon gas or helium gas. There are many holes in the surface of the iodine injection tube 110, located above the singlet oxygen generator 104, in order to supply iodine molecules. When the iodine molecules react with singlet oxygen molecules, excited iodine is generated. The excited iodine can produce a laser action, generating the laser L1 which is extracted from the output mirror 103. The iodine injection tube 110 itself can be heated instead of heating the iodine molecules.

The details of the pulsed iodine laser, as the processing laser 100, are explained using FIG. 3. FIG. 3 is a cross sectional drawing, perpendicular to the optical axis, of the pulsed iodine laser oscillator 100. The main components of the pulsed iodine laser are a laser cavity 112 and the singlet oxygen generator 104. After the singlet oxygen molecules are generated from the surface of the discs 106, the singlet oxygen molecules go into the laser cavity 112 as shown by the arrow 111. The laser cavity 112 is placed above the singlet oxygen generator 104. The singlet oxygen molecules react with iodine molecules which come out from the holes of the injection tube 110. Since the lower halves of the discs 106 are soaked in the BHP solution 105, the surfaces of the upper halves of the discs 106 are wetted with the BHP solution 105 by being rotated around the rotation axis 107.

Although the chlorine gas to generate singlet oxygen molecules is supplied from a chlorine gas container 115, the chlorine gas is temporarily reserved in a chlorine gas tank 116 which has a large internal volume. This is because the chlorine gas needs to be supplied into the singlet oxygen generator 104 at a high flow rate. When a valve 117 opens, the chlorine gas is supplied into the singlet oxygen generator 104 through a chlorine supplying tube 118. Then the supplied chlorine gas immediately contacts the upper halves of the discs 106. Consequently, a large number of singlet oxygen molecules are generated, and the iodine laser gives a pulse oscillation. Therefore in order to start the pulse oscillation, the signal S1 is sent to open the valve 117.

Although as explained above, in the first embodiment, the pulsed iodine laser is used as a processing laser 100, a flashlamp-pumped Nd:YAG laser can be used instead. The reason for using a pulsed iodine laser is that it enables a high-quality beam to be obtained easily because it is a gas laser which can easily generate a near diffraction-limit beam with a single transverse mode. As shown in FIG. 2, this is because the mode volume can easily form a long geometry, in which laser oscillation becomes a single transverse mode easily.

Figure 4:
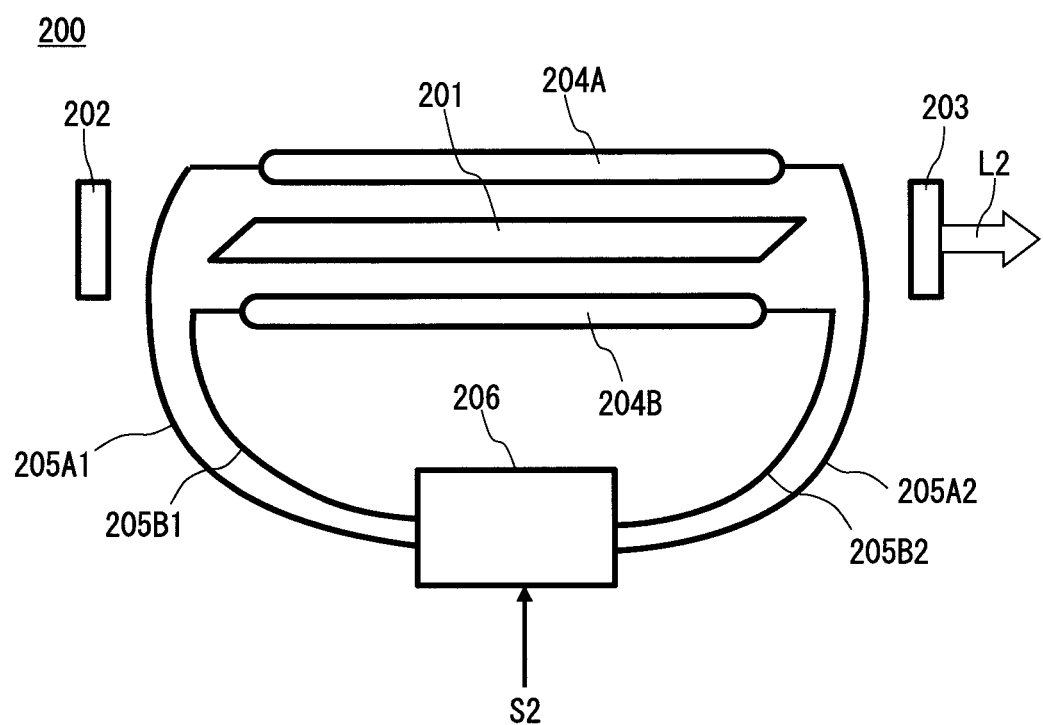
FIG. 4 is a cross sectional drawing of a vaporization laser 200 according to an embodiment of the invention.

The details of the vaporization laser 200 illustrated in FIG. 1 are explained using FIG. 4. The FIG. 4 is a cross sectional drawing of an Er:YAG laser oscillator as the vaporization laser 200 along the optical axis of the Er:YAG laser oscillator.

An Er:YAG crystal 201 used as the laser medium forms slab shape. The Er:YAG crystal 201 is located in the laser cavity which has a total reflector 202 and an output mirror 203. Near the upper surface of the Er:YAG crystal 201, a flashlamp 204A is located. Likewise, near the lower surface of the Er:YAG crystal 201, a flashlamp 204B is located. The flashlamps 204A and 204B are connected to an electric circuit 206 through power cables 205A1, 205A2, 205B1, and 205B2.

In order to oscillate the vaporization laser 200, a signal S2 is supplied to the electric circuit 206. Then the flashlamps 204A and 204B flash emit light, and the Er:YAG crystal 201 is excited. Consequently the vaporization laser 200 oscillates, and a pulsed laser L2 is extracted from the output mirror 203.

Figure 6:
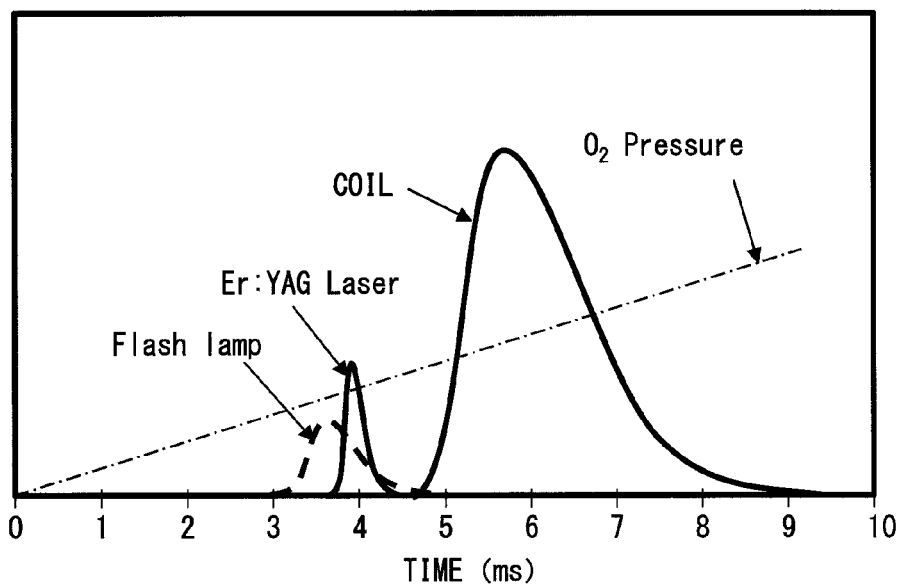
FIG. 6 is a graph explaining the operation timing of the pulsed iodine laser and the pulsed vaporization.

Here the oscillation timing for both the processing laser 100 and the vaporization laser 200 is explained using FIG. 6. The horizontal-direction axis of FIG. 6 indicates time and the vertical axis of FIG. 6 indicates intensity. But the vertical-direction axis does not indicate a quantitative value. Time of 0 indicates the timing of the signal S1.

When the chlorine gas starts to be supplied, upon the signal S1 being given, into the singlet oxygen generator 104 of the processing laser 100, the pressure of the oxygen molecules in the housing 112 starts to increase linearly. But the iodine laser starts to oscillate after the oxygen pressure reaches some value. In this embodiment, the iodine laser starts to oscillate at approximately 4 ms after the start of supplying the chlorine gas, and then the laser L1 is extracted.

When the signal S2 is generated at approximately 3 ms after the signal S1, the flashlamps 204A and 204B, used for the vaporization laser 200, start to flash. Consequently the vaporization laser 200 oscillates at approximately 1 ms after the flashlamps 204A and 204B start to flash, and then laser L2 is extracted. Therefore laser L2 is extracted at approximately 1 ms before laser L1 is extracted. Needless to say, the vaporization laser 200 may oscillate 1 ms or less before the oscillation timing of the processing laser 100.

Figure 7:
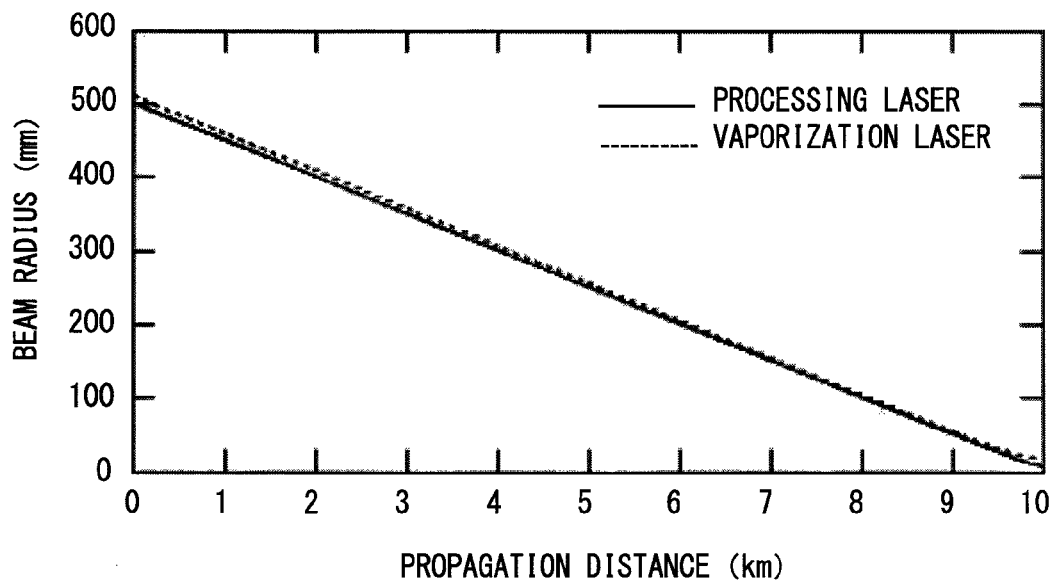
FIG. 7 is a graph showing radii of the beam of the processing laser and that of the vaporization laser.
Figure 8:
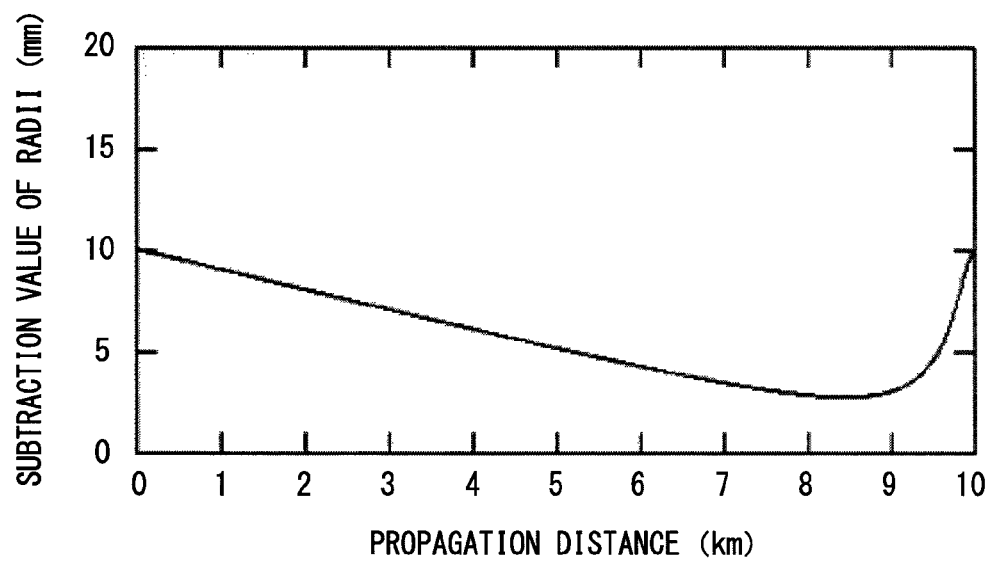
FIG. 8 is a graph showing a subtraction of the beam radius of the processing laser from that of the evaporation laser.
Figure 9:
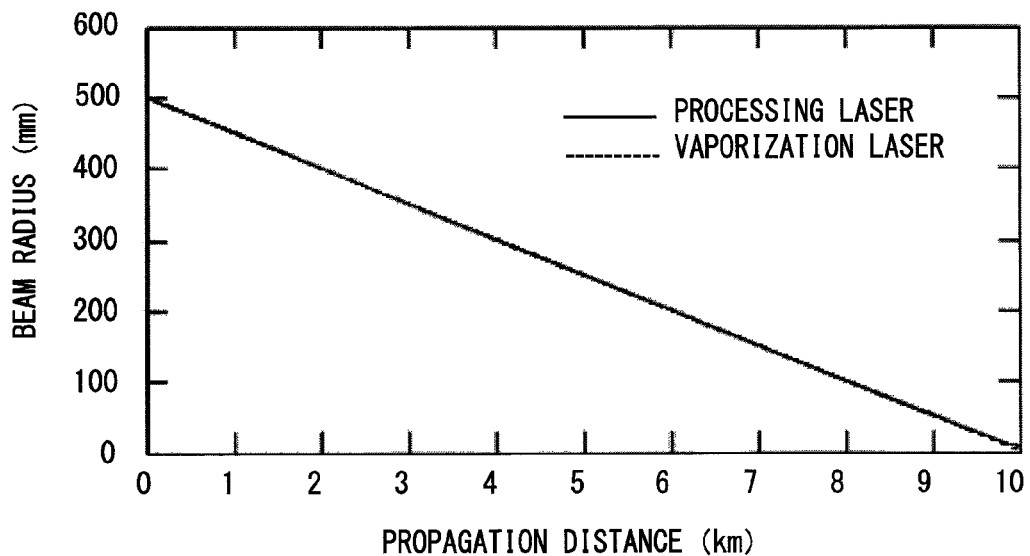
FIG. 9 is a graph showing radii of the beam of the processing laser and that of the vaporization laser with wavelength of 0.248 um.
Figure 10:
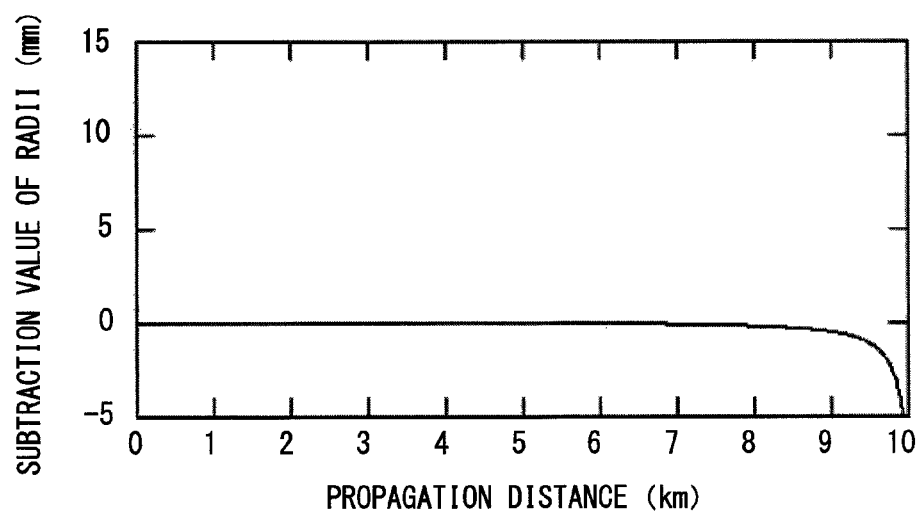
FIG. 10 is a graph showing a subtraction of the beam radius of the processing laser from that of the evaporation laser with wavelength of 0.248 um.
Figure 11:
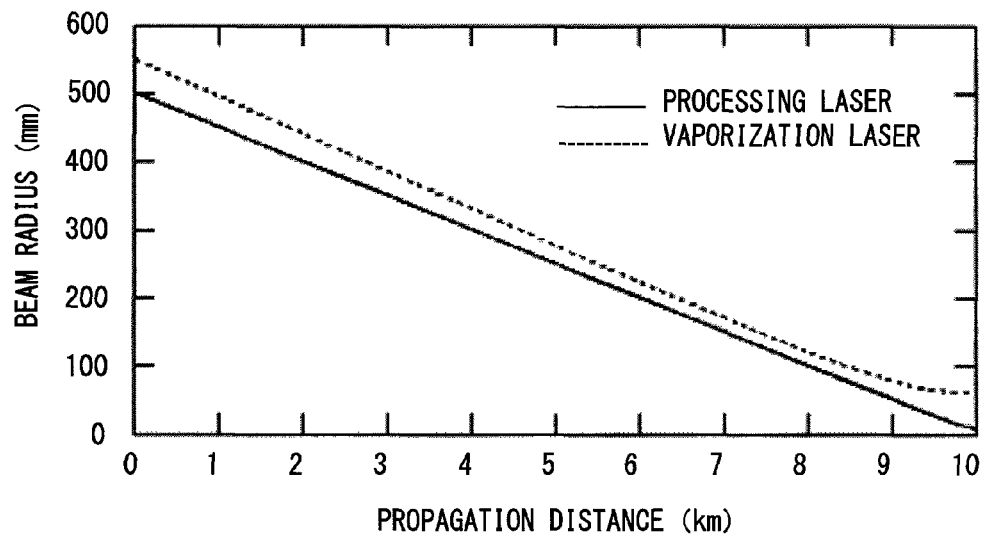
FIG. 11 is a graph showing radii of the beam of the processing laser and that of the vaporization laser with wavelength of 10.6 um.
Figure 12:
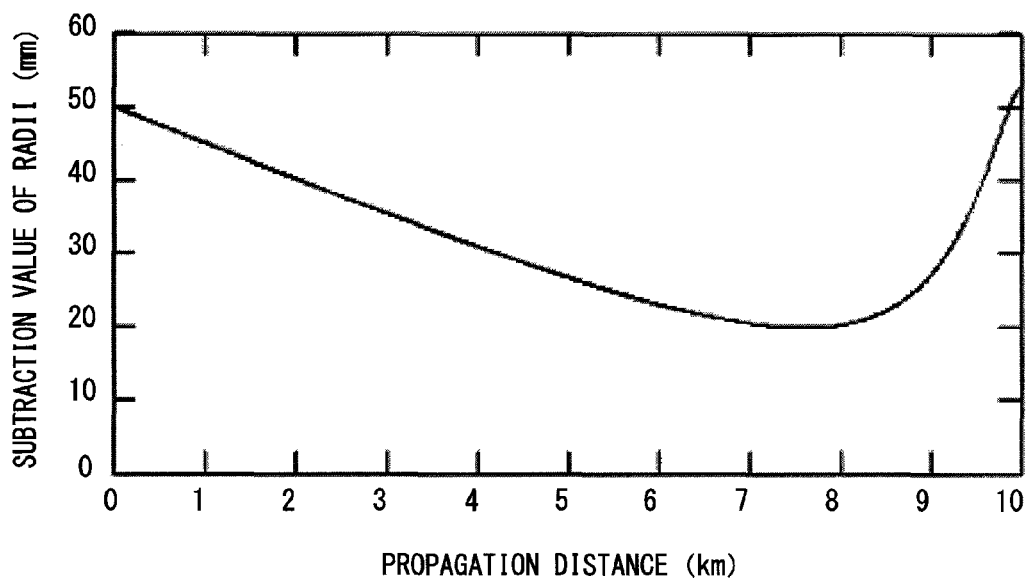
FIG. 12 is a graph showing a subtraction of the beam radius of the processing laser from that of the evaporation laser with wavelength of 10.6 um.

The following is an explanation of why the beam path of the processing laser 100 can become a high transparent path of the vaporization laser 200 used in the laser processing system 1. FIGS. 7 to 12 show the simulation results concerning the processing laser 100 and the vaporization laser 200 on the assumption that the two laser beams both have diffraction-limited high beam quality. In the simulation results shown in FIGS. 7 to 12, the processing laser and the vaporization laser are focusing at a target at a distance of 10 km. FIGS. 7, 9 and 11 show the beam radii of the processing laser and the vaporization laser. FIGS. 8, 10 and 12 show the values of the radius of the processing laser subtracted from that of the vaporization laser.

FIGS. 7 and 8 correspond to the above embodiment of the laser processing system 1, in which the processing laser is a 1.315 µm wavelength iodine laser and the vaporization laser is a 2.94 µm wavelength Er:YAG laser. The beam radius of laser L1 from the processing laser 100 is assumed to be 500 mm at the large focusing mirror 8, and the beam radius of laser L2 from the vaporization laser 200 is assumed to be 510 mm at the large focusing mirror 8.

As shown in FIG. 8, the subtraction of the beam radius is always plus, which means that the beam path of lasers L4 and L6 from the processing laser 100 is contained in a high transmission path made by lasers L5 and L7 from the vaporization laser 200. Therefore lasers L4 and L6 from the processing laser 100 can be efficiently propagated to the target 10.

The changing characteristics of beam radius are shown in FIGS. 9 and 10 in the case of using a KrF excimer laser oscillating at 0.248 µm as a vaporization laser 200. The laser at wavelength of 0.248 µm is relatively well-absorbed into water. In FIGS. 9 and 10, the processing laser 100 is the iodine laser with a wavelength of 1.315 µm as described above. The beam radius of laser L1 from the processing laser 100 is assumed to be 500 mm at the large focusing mirror 8. The beam radius of laser L2 from the vaporization laser 200 is assumed to be 500 mm at the large focusing mirror 8. As shown in FIG. 10, the subtraction becomes minus. This means the beam diameter of the laser from the KrF excimer laser is smaller than that of the laser from the processing laser 100 near the target 10.

Although FIGS. 9 and 10 show the changing characteristics of beam radius in the case of using a chemical iodine laser as the processing laser 100, if a Nd:YAG laser is used as a processing laser 100, both lasers have a longer wavelength than that of the KrF excimer laser. Therefore the radius of the beam from the KrF excimer laser becomes smaller near the target 10 if the beam radius at the large focusing mirror 8 from the KrF excimer laser is adjusted to be equal or larger than that of the processing laser. This is because the shorter wavelength beam has a smaller beam diffraction, and hence, has a smaller focusing size. Consequently the part of the beam from the processing laser gets outside of the high transparent path. This is the reason the wavelength of the vaporization laser 200 is longer than that of the processing laser 100 in the present invention of the laser processing system 1. For example, the wavelength of the vaporization laser 200 may be equal to or longer than 1.4 µm.

Additionally, the changing characteristics of the beam radius are shown in FIGS. 11 and 12 in the case of using a $CO_2$ laser oscillating at 10.6 µm as the vaporization laser 200. In FIGS. 11 and 12, the processing laser 100 is the iodine laser with a wavelength of 1.315 µm as described above. The beam radius of laser L1 from the processing laser 100 is assumed to be 500 mm at the large focusing mirror 8, and the beam radius of laser L2 from the vaporization laser 200 is assumed to be 550 mm at the same large focusing mirror 8.

As shown in FIG. 12, when the vaporization laser 200 oscillates at 10.6 µm, the subtraction of the beam radius is always plus. Therefore, lasers L4 and L6 from the processing laser 100 can propagate in the high transmission path formed by lasers L5 and L7 from the vaporization laser 200. Therefore absorption of the lasers L4 and L6 by a cloud or a fog can be reduced.

In this embodiment, a pulsed laser such as a flashlamp-pumped solid-state laser oscillating at a 1.06 µm wavelength, a pulsed iodine laser, or an oxygen molecule laser can be used as the processing laser 100. And a pulsed laser oscillating at a wavelength of longer than 1.4 µm can be used as a vaporization laser 200. Also the controller 3 controls the oscillation of the processing laser 100 just after the oscillation of the vaporization laser 200.

In this configuration, since the vaporization laser 200 is also a pulsed laser, the beam path of the processing laser 100 can become a high transmission path by a single pulse from the vaporization laser 200. Even in a strong wind, the lasers L4 and L6 from the processing laser 100 can propagate in the highly transparent path. Therefore, the target 10 placed at a far distance can be processed even if a cloud or a fog is present during the propagation in the air.

For the vaporization laser 200, using an Er:YAG laser or a $CO_2$ laser is desirable, as it can effectively vaporize the cloud and the fog. For the processing laser 100, using a pulsed iodine laser or an oxygen molecule laser, and using the timing of supplying chlorine gas to the singlet oxygen generator used for the control of the oscillation timing of the iodine laser or the oxygen molecule laser, are desirable.

The present invention has the capability of making a hole in a target placed at a far distance away through a cloudy or foggy air. The present invention can make a hole in the body of an aircraft which may attack, and can force it to stop flying, or it can shoot it down.

While the invention has been particularly shown and described with reference to exemplary embodiments thereof, the invention includes various changes which do not negatively affect the purpose and benefits of the invention and is not limited to these exemplary embodiments.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser processing system comprising:
   a first pulsed laser apparatus that is a pulsed iodine laser or an oxygen molecule laser;
   a second pulsed laser apparatus with a wavelength of longer than 1.4 µm; and
   a controller which controls oscillation timing of the first pulsed laser apparatus so that it oscillates after the second pulsed laser apparatus,
   wherein the oscillation timing of the second pulsed laser apparatus is controlled based on timing of supplying chlorine gas to a singlet oxygen generator of the oxygen molecule laser or the iodine laser.

2. The laser processing system according to claim 1, further comprising a focusing mirror that reflects a first laser emitted from the first pulsed laser apparatus and a second laser emitted from the second pulsed laser apparatus to focus the first laser and the second laser on a target.

3. The laser processing system according to claim 1, wherein the second pulsed laser apparatus is an Er:YAG laser.

4. The laser processing system according to claim 1, wherein the second pulsed laser apparatus is a $CO_2$ laser.

5. A laser processing method using a first pulsed laser apparatus and a second pulsed laser apparatus; the method comprising:
   oscillating a pulsed laser with a wavelength of longer than 1.4 µm using the second pulsed laser apparatus; and
   oscillating the first pulsed laser apparatus after an oscillation timing of the second pulsed laser apparatus, the first laser apparatus being a pulsed iodine laser or an oxygen molecule laser,
   wherein the oscillation timing of the second pulsed laser apparatus is controlled based on timing of supplying chlorine gas to a singlet oxygen generator of the oxygen molecule laser or the iodine laser.

\* \* \* \* \*